United States Patent [19]
Fulk, Jr. et al.

[11] Patent Number: 5,938,922
[45] Date of Patent: Aug. 17, 1999

[54] CONTACTOR FOR DEGASSING LIQUIDS

[75] Inventors: C. William Fulk, Jr.; James J. Lowery; Charles J. Runkle, all of Charlotte, N.C.

[73] Assignee: Celgard LLC, Charlotte, N.C.

[21] Appl. No.: 08/914,740

[22] Filed: Aug. 19, 1997

[51] Int. Cl.[6] .................................................. B01D 63/02
[52] U.S. Cl. ................... 210/321.81; 210/321.9; 210/416.1; 210/437; 210/500.23; 422/48
[58] Field of Search ............... 210/321.81, 321.9, 210/416.1, 456, 437, 500.23; 422/44, 45, 48

[56] References Cited

U.S. PATENT DOCUMENTS

| | | | |
|---|---|---|---|
| 4,220,535 | 9/1980 | Leonard | 210/456 |
| 4,451,369 | 5/1984 | Sekino et al. | 210/321.9 |
| 5,264,171 | 11/1993 | Prasad et al. | 264/103 |
| 5,352,361 | 10/1994 | Prasad et al. | 210/321.81 |
| 5,470,469 | 11/1995 | Eckman | 210/456 |
| 5,714,072 | 2/1998 | Reed et al. | 210/500.23 |

*Primary Examiner*—John Kim
*Attorney, Agent, or Firm*—Robert H. Hammer, III

[57] ABSTRACT

A contactor for degassing liquids includes a perforated core, a plurality of microporous hollow fibers, and a shell. The fibers surround the core and have two ends. A tube sheet affixes the ends of the fibers. A baffle is located between the tube sheets. The hollow fibers are closed at the baffle. The shell encloses the fibers, tube sheets, and the baffle. The system for degassing liquids includes a source of liquid containing a gas, a source of vacuum, and the contactor.

9 Claims, 5 Drawing Sheets

CONTACTOR FOR DEGASSING LIQUIDS

FIELD OF THE INVENTION

The present invention is a contactor and system for degassing liquids.

BACKGROUND OF THE INVENTION

Contactors capable of separating fluids are known, for example see U.S. Pat. Nos. 4,220,535; 5,264,171; and 5,352,361, each is incorporated herein by reference. Those contactors consist of a perforated center tube, a plurality of hollow fibers surrounding the tube, tube sheets affixing the ends of the hollow fibers, a baffle located between the tube sheets, and a shell surrounding the tube, fibers, tube sheets, and baffle. The fibers, however, are not closed at the baffle, but instead are open, so that there is fluid communication through the hollow fiber lumen from one tube sheet to the other.

Contactors capable of separating fluids, for example, dissolved gas from water, have numerous industrial applications. Those applications include: rust prevention systems for boilers or power plant turbines; rust prevention systems for drinking water, cooling water, or hot water pipe lines; ultra-pure water sources for the electronics industry (e.g., rinsing semiconductor wafers during manufacture); ultrasonic cleaning processes; water sources for food processing; and the like.

Two of the foregoing applications are of particular interest. They are rust prevention in water pipe lines and ultra-pure water sources for the electronics industry. In each application, the removal of dissolved oxygen from water is extremely important. In rust prevention in water pipe lines, the oxygen reacts with dissolved iron or iron from the pipe line to form rust that may precipitate. In potable water, the rust precipitate is unattractive and causes staining; and in pipe lines, it can cause occlusion of the pipe. In ultra-pure water for the electronics industry, water is used to rinse semiconductor wafers during manufacture. Dissolved oxygen in the rinse water can etch the surface of the wafer and destroy it; it can also coat the wafer surface and prevent effective rinsing. Accordingly, the removal of dissolved gasses from water is extremely important.

Therefore, there is a need to develop new contactors and systems for degassing of liquids.

SUMMARY OF THE INVENTION

The present invention is a contactor and a system for degassing a liquid.

The contactor includes a perforated core, a plurality of microporous hollow fibers, and a shell. The fibers surround the core and have two ends. A tube sheet affixes the ends of the fibers. A baffle is located between the tube sheets. The hollow fibers are closed at the baffle. The shell encloses the fibers, tube sheets, and the baffle.

The system for degassing liquids includes a source of liquid containing a gas, a source of vacuum, and a contactor. The source of liquid is in fluid communication with one end of the core. The source of vacuum is in fluid communication with the lumens of the hollow fibers through the tube sheets. The liquid passes out of the core, across the fibers, around the baffle, across the fibers, and back into the core.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
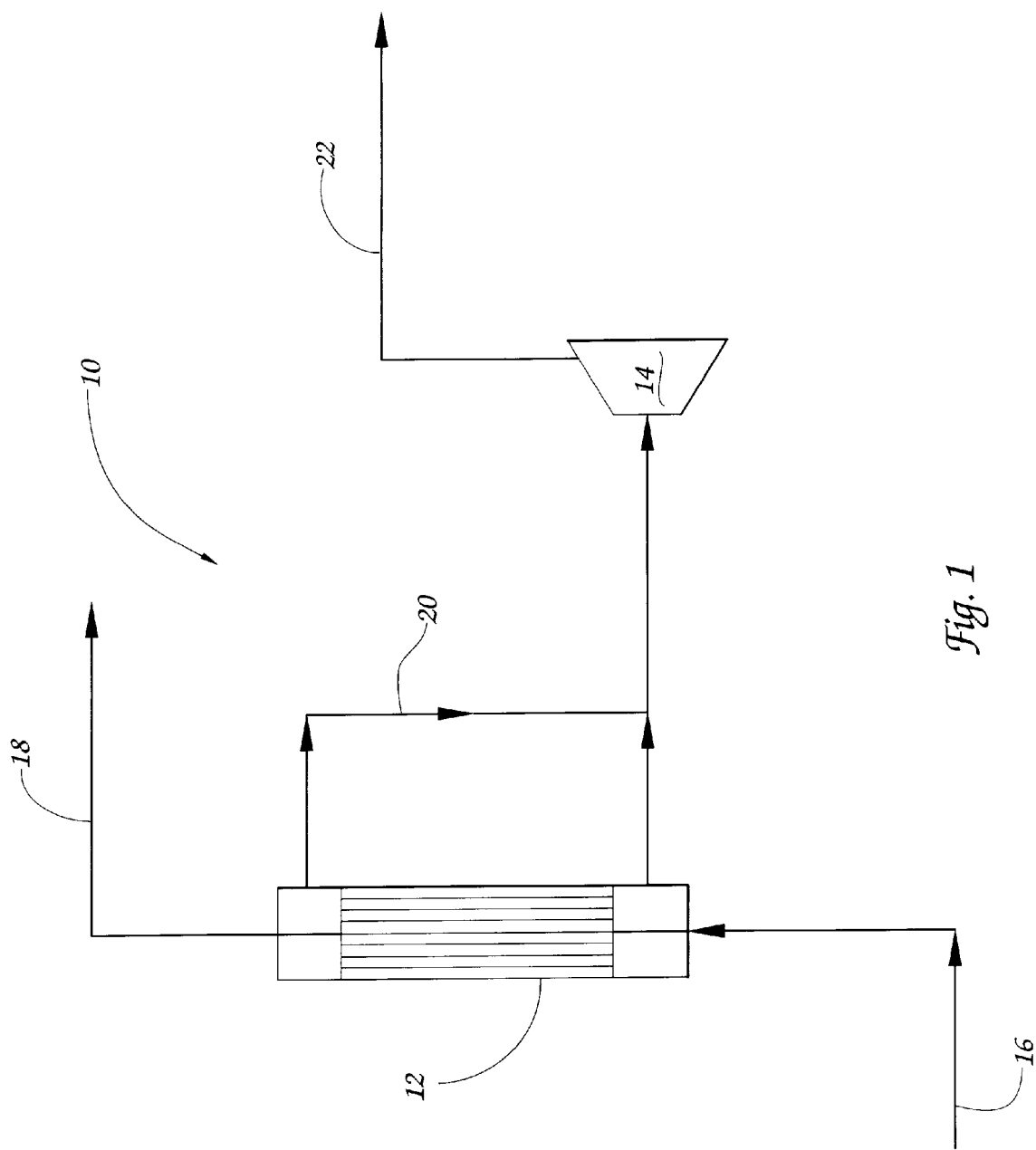
FIG. 1 is a schematic illustration showing a system for degassing a liquid.

Referring to the drawings, wherein like numerals indicate like elements, there is shown in FIG. 1 a schematic illustration of system 10.

System 10 is for degassing liquids. System 10 generally comprises a contactor 12 (discussed in greater detail below), a vacuum source 14, an ingress 16 for liquid with gas, an egress 18 for degassed liquid. Vacuum source 14 is interconnected to contactor 12 via vacuum piping 20. Vacuum is drawn from both ends of contactor 12. (The importance of this configuration will be discussed in greater detail below.) Liquid with gas is fed into the ingress 16 of contactor 12. Degassed liquid is removed from the egress 18 of contactor 12. (The operation of the contactor will be discussed in greater detail below.) Further detail about the operation of system 10, with regard to specific applications, will be discussed below.

Figure 2:
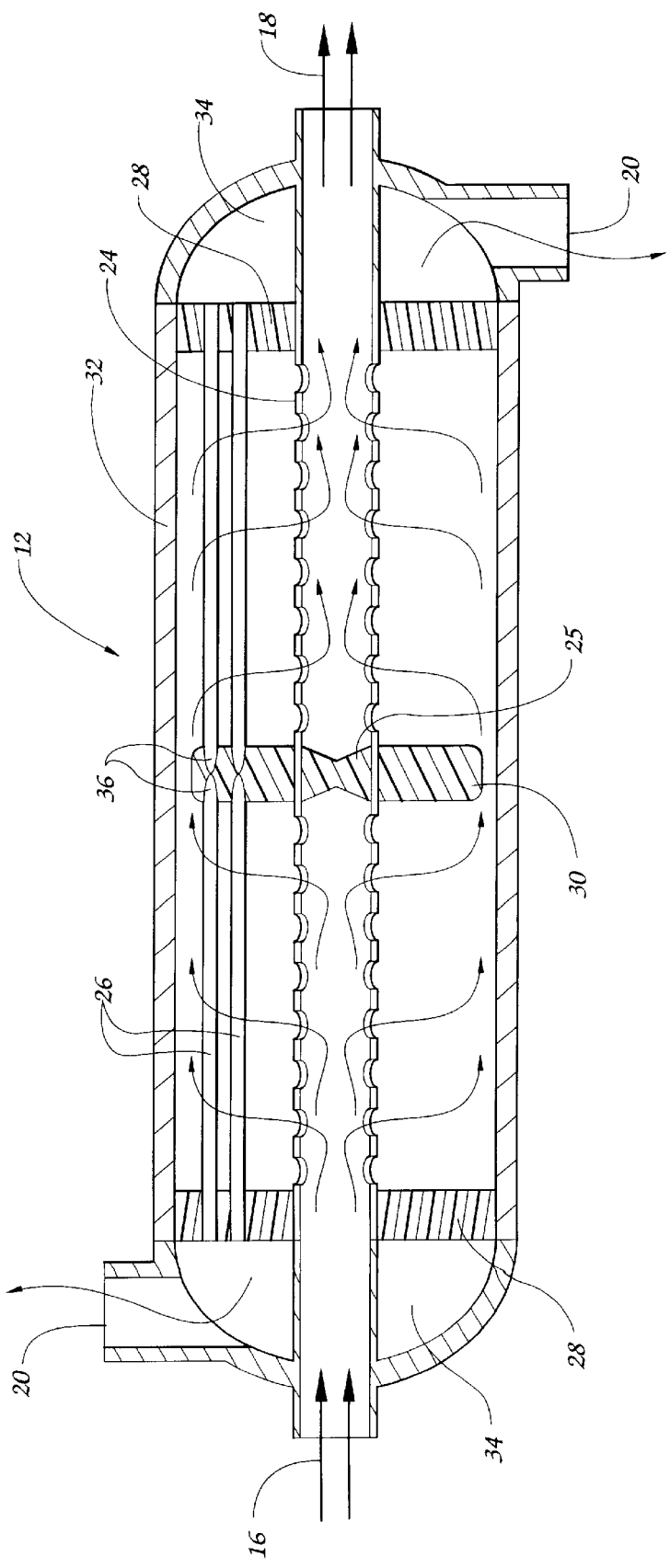
FIG. 2 is a sectional view of a first embodiment of the inventive contactor.
Figure 3:
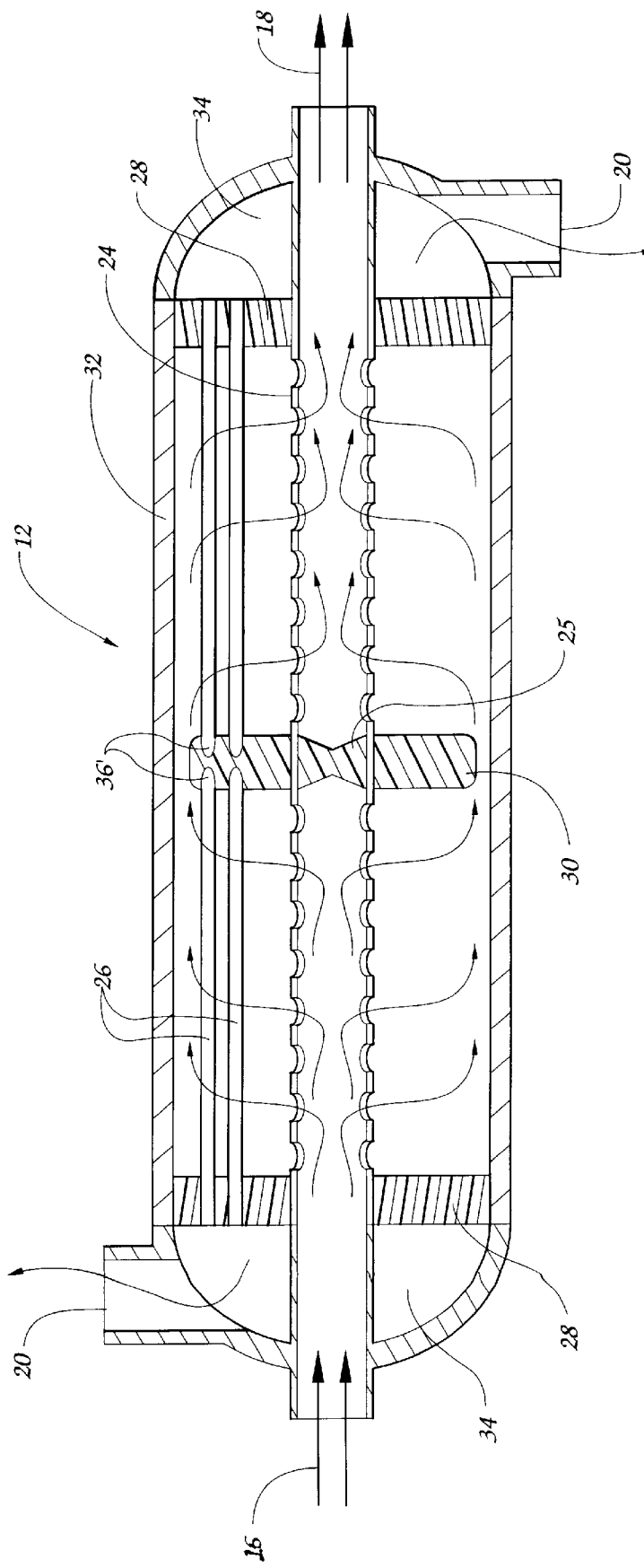
FIG. 3 is a sectional view of a second embodiment of the inventive contactor.
Figure 4:
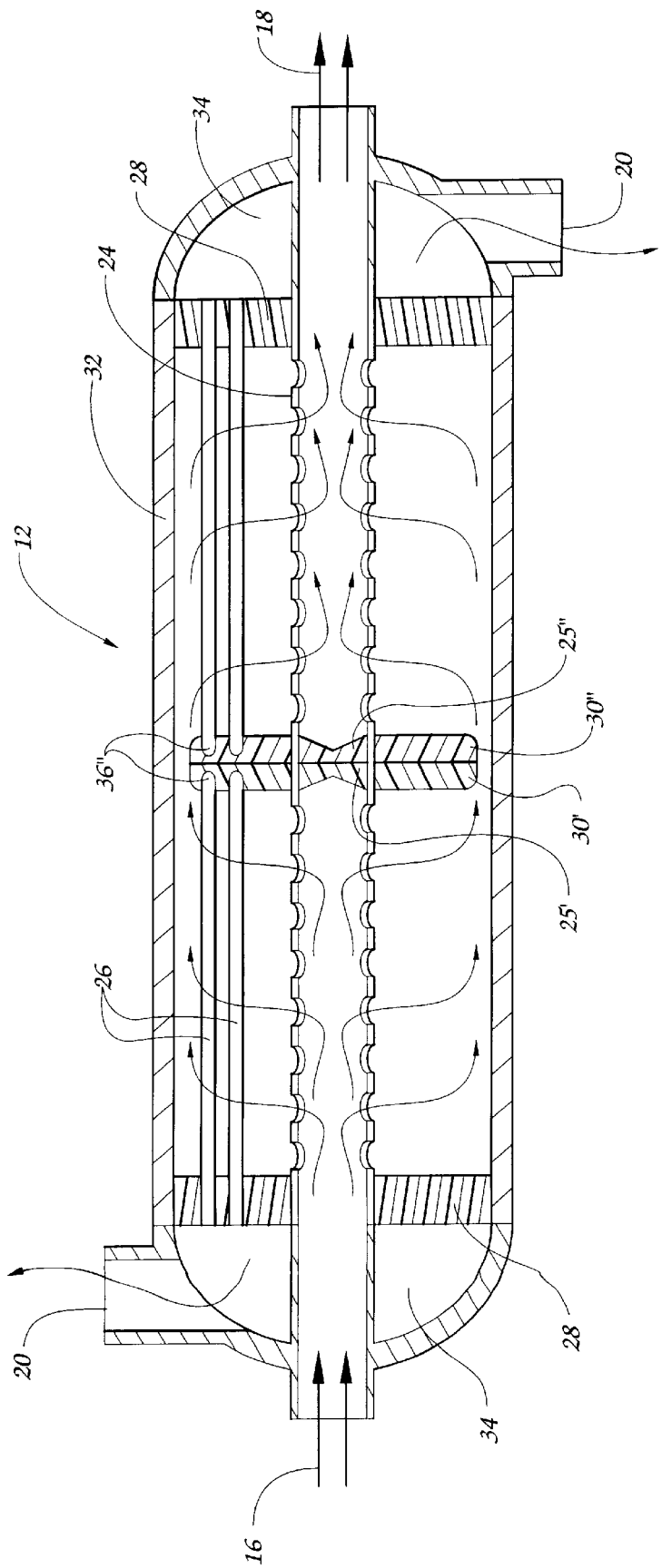
FIG. 4 is a sectional view of a third embodiment of the invention contactor.

Referring to FIGS. 2, 3, and 4, contactor 12 generally comprises a perforated core 24, a plurality of hollow fibers 26 surrounding core 24, tube sheets 28 at the ends of fibers 26, a baffle 30 between sheets 28 and for holding fibers 26, and a shell 32 surrounding the core, fibers, sheets, and baffle. The contactor 12 is a mass transfer device whereby liquid containing dissolved gas is introduced via ingress 16 to core 24. The core 24 preferably includes a diverter 25. Diverter 25 is a block in core 24 which prevents direct fluid communication from ingress 16 to egress 18. Liquid passes outside of core 24. Liquid flows across fibers 26, around baffle 30, across fibers 26, and back into core 24 and exits via egress 18. Contactor 12 is in fluid communication with vacuum source 14 via piping 20. Piping 20 is in communication with vacuum head space 34. Head space 34 and the lumen of the hollow fiber 26 are in communication.

In general, contactor 12 is constructed as set forth in U.S. Pat. Nos. 5,264,171 and 5,352,361, both of which are incorporated herein by reference. In the preferred embodiment, core 24 is tubular and coaxial with shell 32; baffle 30 is equidistant from tube sheets 28 and in contact with core 24; diverter 25 is coplanar with baffle 30; and the hollow fibers 26 and the density of hollow fibers 26, on either side of baffle 30, are identical. The invention, however, is not so limited.

The difference between the contactors illustrated in FIGS. 2, 3, and 4 relates to the terminus 36 of hollow fiber 26 which is preferably within baffle 30. For example, in FIG. 2, termini 36 of fibers 26 are pinched closed. The hollow fibers are preferably formed into fiber mat prior to winding onto core 24, termini 36 are formed by a welding device, e.g., heat, ultrasonic, etc. In FIG. 3, an alternate embodiment is illustrated. Therein, termini 36' within baffle 30 are physically cut and blocked. In FIG. 4, termini 36" are formed into discrete baffle portions 30' and 30".

In operation, mass transfer of dissolved gas from the liquid is enhanced by the inventive contactor design. As in all mass transfer devices, transport is driven by the concentration gradient. In the instant invention, the concentration gradient is maximized over concurrent or counter current flow by drawing vacuum from both the tube sheet ends of the hollow fibers. This is further illustrated in reference to FIG. 5.

Figure 5:
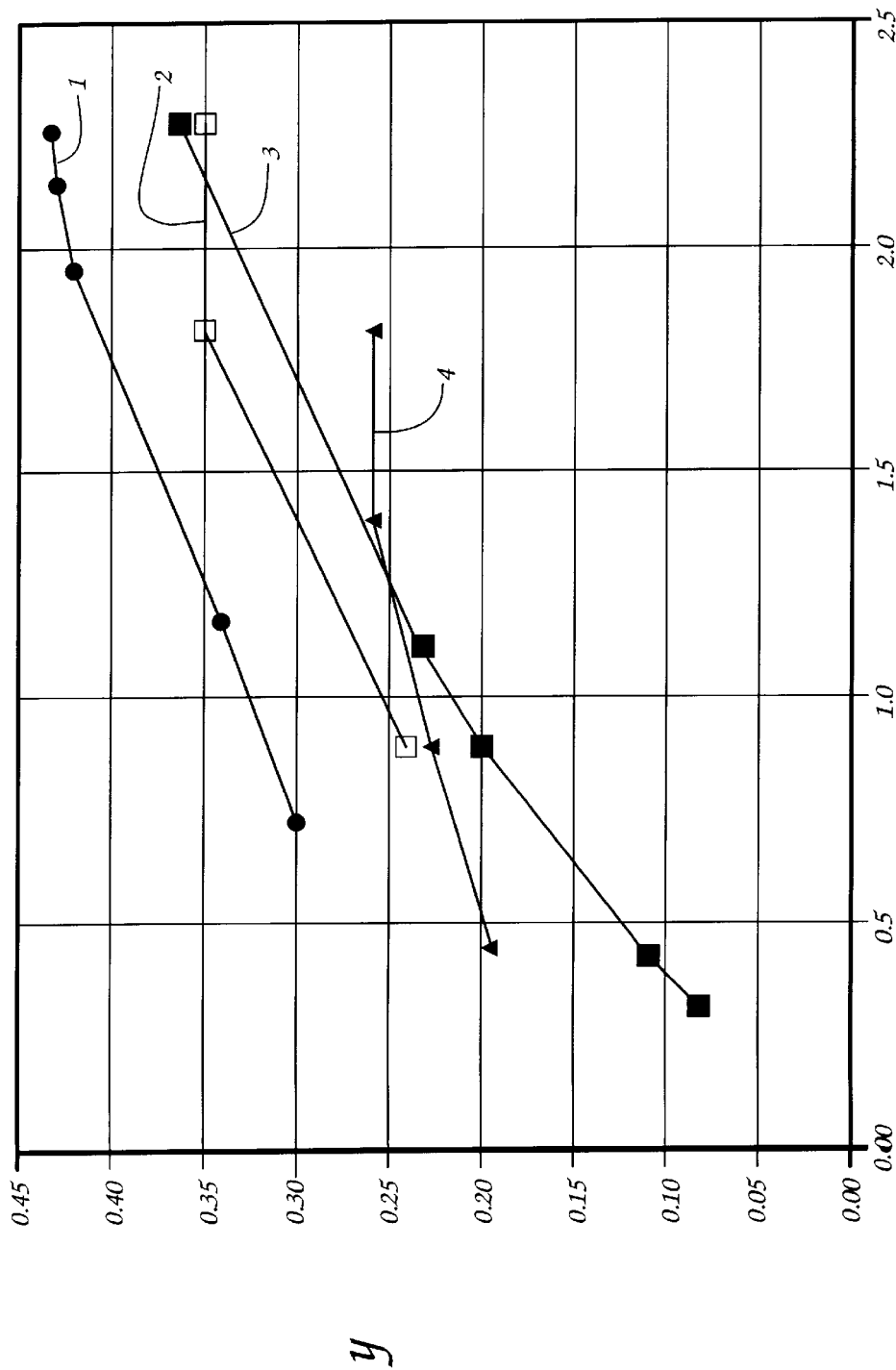
FIG. 5 is a graphical comparison of the overall mass transfer coefficient as a function of flow rate (liquid) of various contactors (invention and non-invention).

In FIG. 5, a comparison of overall mass transfer coefficient, $K_{OA}$ (meter/hour, m/h), y axis, as a function of liquid flow rate (cubic meter/hour, $m^3/h$), x axis, is made for various contactors. In each instance, the contactor was operated at 25° C.; 18 torr; and 8500 $mg/m^3$ (ppb) of dissolved oxygen in water. Curve 1 is a contactor made according to the instant invention and has an exterior hollow fiber surface area of 19.3 square meters (CELGARD® X-40 hollow fiber, commercially available from Hoechst Celanese Corporation, Separation Products Group of Charlotte, N.C., USA, is used as the membrane). Curve 2 is a contactor having an exterior hollow fiber surface area of over 30 square meters and is commercially available from Dianippon Ink and Chemical, Inc. of Tokyo, Japan (the contactor is identified as SEPAREL® EFM-530 GM112) . Curve 3 is a contactor having an exterior hollow fiber surface area of 19.3 square meters and is made according to U.S. Pat. Nos. 5,264,171 and 5,352,361 and marketed under the tradename LIQUI-CEL® contactors from Hoechst Celanese Corporation, Separation Products Group of Charlotte, N.C., USA; the hollow fiber membrane is the CELGARD® X-40 fiber mentioned above. Curve 4 is a contactor having an exterior hollow fiber surface area of 19.3 square meters and is made according to U.S. Pat. Nos. 5,264,171 and 5,352, 361, except no baffle was used; the hollow fiber membrane is the CELGARD® X-40 fiber mentioned above.

The curves in FIG. 5 were generated according to the following formula $$K_{OA} A/Q = \ln(C_i/C_o)$$

where:
KOA is the overall mass transfer coefficient (m/h)
A=exterior membrane surface area ($m^2$)
Q=liquid flow rate ($m^3/h$)
C=concentration dissolved gas, $O_2$, i=inlet, o=outlet.

In the application for rust prevention of industrial water, industrial water typically has an oxygen content of greater than or about 9000 parts per billion (ppb). In most industrial applications, oxygen should be removed to the content of less than 500 ppb. Using the inventive contactor, this can be accomplished with vacuum of less than 50 torr and a contactor having about 200 square feet of membrane contact surface area. In ultra-pure water source applications, feed water, typically has a dissolved oxygen content of greater than or about 9000 ppb, can be degassed so that there is less than 1 to 10 ppb of oxygen. This can be accomplished with the inventive contactor using vacuum of 15 to 20 torr and a contactor having an effective surface area of about 200 square feet.

In general, the system may be used in any liquid degassing process. Such other processes include oxygen removal from boiler feed water for corrosion prevention, carbon dioxide removal from water to prolong deionization resin life between regeneration, and those previously mentioned. The vacuum source may range from 125 torr to 18 torr.

The present invention may be embodied in other specific forms without the departing from the spirit or essential attributes thereof, and, accordingly, reference should be made to the appended claims, rather than to the foregoing specification as indicating the scope of the invention.

We claim:

1. A contactor comprising:
    a perforated core having an inlet and an outlet;
    a plurality of microporous hollow fibers surrounding said core, said fibers having two ends, a tube sheet affixing each said end, a baffle being located between said tube sheets and said fibers being closed at said baffle; and
    a shell enclosing said fibers, tube sheets, and baffle, and said fibers adapted for fluid communication through said shell.

2. The contactor according to claim 1, wherein said fibers are pinched closed.

3. The contactor according to claim 1, wherein said fibers are closed by cutting and blocking.

4. The contactor according to claim 1, wherein said baffle comprises two discrete halves, said fibers terminating having a terminus in one said half.

5. A system for degassing liquids comprises:
    a source of liquid containing a gas;
    a source of vacuum; and
    a contactor comprising
        a perforated core having an inlet and an outlet,
        a plurality of microporous hollow fibers having lumens surrounding said core, said fibers having two ends, a tube sheet affixing each said end, a baffle being located between said tube sheets, and said fibers being closed at said baffle, and
        a shell enclosing said fibers, tube sheets, and baffle, and said lumens of said fibers adapted for fluid communication with said vacuum source through said shell; whereby said source of liquid being in fluid communication with said inlet of said core, said source of vacuum being in fluid communication with said lumens through said tube sheets, said liquid passing out of said core, across said fibers, around said baffle, across said fibers, passing back into said core, and exiting through said outlet of said core.

6. The system according to claim 5, wherein said liquid is water.

7. The system according to claim 5, wherein said vacuum source ranges from 125 torr to 8 torr.

8. The system according to claim 5, wherein said system is used for rust prevention.

9. The system according to claim 5, wherein said system is used as a source of ultra-pure water.

* * * * *